(12) United States Patent
Benirschke et al.

(10) Patent No.: US 12,460,986 B2
(45) Date of Patent: Nov. 4, 2025

(54) END FITTING APPARATUS AND METHOD

(71) Applicant: Baker Hughes Energy Technology UK Limited, Bristol (GB)

(72) Inventors: Carol Benirschke, Newcastle upon Tyne (GB); Andrew Roberts, Newcastle upon Tyne (GB)

(73) Assignee: Baker Hughes Energy Technology UK Limited (GB)

( * ) Notice: Subject to any disclaimer, the term of this patent is extended or adjusted under 35 U.S.C. 154(b) by 154 days.

(21) Appl. No.: 17/754,045

(22) PCT Filed: Sep. 24, 2020

(86) PCT No.: PCT/GB2020/052321
§ 371 (c)(1),
(2) Date: Mar. 22, 2022

(87) PCT Pub. No.: WO2021/058966
PCT Pub. Date: Apr. 1, 2021

(65) Prior Publication Data
US 2022/0341808 A1    Oct. 27, 2022

(30) Foreign Application Priority Data
Sep. 24, 2019   (GB) ...................................... 1913740

(51) Int. Cl.
*G01M 3/22*   (2006.01)
*F16L 33/01*   (2006.01)
(52) U.S. Cl.
CPC ............. *G01M 3/223* (2013.01); *F16L 33/01* (2013.01); *F16L 2201/30* (2013.01)

(58) Field of Classification Search
CPC ...... F16L 2201/30; F16L 33/01; G01M 3/223
See application file for complete search history.

(56) References Cited

U.S. PATENT DOCUMENTS

| | | | |
|---|---|---|---|
| 4,468,609 A * | 8/1984 | Schmitz | G01M 3/002 |
| 10,001,233 B2 * | 6/2018 | Lee | G01M 3/042 |
| 2013/0180318 A1 * | 7/2013 | Howard | G01M 3/18 |

FOREIGN PATENT DOCUMENTS

| | | |
|---|---|---|
| CN | 101105263 | 1/2008 |
| EP | 2708788 A1 | 3/2014 |
| JP | 2001132876 A | 5/2001 |
| JP | 2010265994 A | 11/2010 |

(Continued)

OTHER PUBLICATIONS

Examination Report mailed Jun. 6, 2023 in corresponding EP Application No. EP 20780781.9.

(Continued)

*Primary Examiner* — Zachary T Dragicevich
(74) *Attorney, Agent, or Firm* — Baker Hughes Patent Organization

(57) ABSTRACT

An end fitting (400) for a flexible pipe is disclosed. The end fitting comprises a window (410) and a cavity (402) disposed in the end fitting radially inwards of the window and configured to be in fluid communication with an annulus of the flexible pipe, wherein at least a portion of the cavity (402) is visible from the exterior of the end fitting via the window. The end fitting further comprises a dissolvable or dispersible material disposed within the cavity or in fluid communication with the cavity.

17 Claims, 11 Drawing Sheets

(56) References Cited

FOREIGN PATENT DOCUMENTS

| KR | 20130043822 A | * | 5/2013 | ............. G01M 3/22 |
|---|---|---|---|---|
| WO | 2011/026801 A1 | | 3/2011 | |
| WO | 2016/079253 A1 | | 5/2016 | |
| WO | 2019/129806 | | 7/2019 | |
| WO | 2020/057869 | | 3/2020 | |

OTHER PUBLICATIONS

Transmittal of Third Party Observations to Applicant mailed Jun. 1, 2023 in corresponding EP Application No. EP 20780781.9.
Office Action mailed Jun. 30, 2023 in corresponding CN Application No. CN 202080074876.4 (and English translation).

* cited by examiner

END FITTING APPARATUS AND METHOD

The present invention relates to an end fitting and a method. In particular, but not exclusively, the present invention relates to an end fitting for a flexible pipe, and a method of detecting a flooding event in a flexible pipe comprising and end fitting.

Traditionally flexible pipe is utilised to transport production fluids, such as oil and/or gas and/or water, from one location to another. Flexible pipe is particularly useful in connecting a sub-sea location (which may be deep underwater) to a sea level location. The pipe may have an internal diameter of typically up to around 0.6 metres (e.g. diameters may range from 0.05 m up to 0.6 m). Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including polymer, and/or metallic, and/or composite layers. For example, a pipe body may include polymer and metal layers, or polymer and composite layers, or polymer, metal and composite layers.

API Recommended Practice 17B provides guidelines for the design, analysis, manufacture, testing, installation, and operation of flexible pipes and flexible pipe systems for onshore, subsea and marine applications.

API Specification 17J titled "Specification for Unbonded Flexible Pipe" defines the technical requirements for safe, dimensionally and functionally interchangeable flexible pipes that are designed and manufactured to uniform standards and criteria.

The end fittings of a flexible pipe may be used for connecting segments of flexible pipe body together or for connecting them to terminal equipment such as a rigid sub-sea structure or floating facilities. As such, amongst other varied uses, flexible pipe can be used to provide a riser assembly for transporting fluids from a sub-sea flow line to a floating structure. In such a riser assembly a first segment of flexible pipe may be connected to one or more further segments of flexible pipe. Each segment of flexible pipe includes at least one end fitting. FIG. 2 illustrates a riser assembly 200 suitable for transporting production fluid such as oil and/or gas and/or water from a sub-sea location 201 to a floating facility 202.

A cross-section of a known end fitting assembly 300 is shown in FIG. 3. The end fitting 300 includes an end fitting body 301, which includes an internal bore 302 running along its length. The end fitting body is made from steel or other such rigid material. At a first end of the end fitting body 301 there is defined an open mouth region 303 into which an end of a segment of flexible pipe body 100 is located and then terminated. At a further end of the end fitting body 301 is a connector 304. This is formed as a substantially disk-like flared region on the end fitting body. The connector can be connected directly to a matching connector of a further end fitting body of an adjacent segment of flexible pipe body. This can be done using bolts or some other form of securing mechanism. In such a configuration the end fittings would be located in a back-to-back configuration. Alternatively the connector 304 may be connected to a floating or stationary structure such as a ship, platform or other such structure. Various layers of flexible pipe body are introduced to the end fitting assembly, cut to appropriate length, and sealingly engaged with a particular portion of the end fitting.

It is well-known that there are many varied problems associated with the provision of end fittings for ends of flexible pipe body. The end fittings must ensure both good fastening and good sealing. There is a need to seal the bore of the flexible pipe body with the bore of the end fitting. Particular problems occur when the various specific layers of the multi-layer flexible pipe body are terminated. The flexible pipe body may include layers having very different material characteristics, for example single polymer layers and/or interlocked metallic layers. The termination of each of these layers in an end fitting brings with it characteristic problems. For example, flexible pipe body typically includes a fluid-retaining layer (known as a barrier layer or liner) formed generally as a polymer sheath or pressure sheath. Such a layer operates as a primary fluid retaining layer. To prevent rupture of such a layer caused by the pressure of the transported fluid, an interlocked wire layer (known as a pressure armour layer) is often located radially outwards of the fluid-retaining layer. If a pressure armour layer is not supported along its length, it is possible for portions of the fluid-retaining layer or other such underlying layer to burst through under pressure and cause failure of the terminating structure.

The layers of a flexible pipe body can undergo various stresses, and sometimes damage to a layer or multiple layers can occur. In some cases, this can result in a fluid flooding the annulus of the flexible pipe. For example, the rupture of an outer sealing layer can allow sea water into the annulus, or failure of the fluid retaining layer may allow ingress of transported fluid (e.g. oil or gas) into the annulus.

It is known to monitor the flexible pipe for flooding events using various specialised sensors and the like. The sensing equipment may be included within the flexible pipe body and/or the end fitting apparatus. Such sensing equipment can be costly and difficult to maintain.

It would be useful to provide a flood detection system that does not require a specialised sensor.

According to a first aspect of the present invention, there is provided an end fitting for a flexible pipe, the end fitting comprising:
 a window;
 a cavity disposed in the end fitting radially inwards of the window and configured to be in fluid communication with an annulus of the flexible pipe, wherein at least a portion of the cavity is visible from the exterior of the end fitting via the window; and
 a dissolvable or dispersible material disposed within the cavity or in fluid communication with the cavity.
 Suitably, the dissolvable or dispersible material is configured to dissolve or disperse in a liquid medium upon contact therewith such that the liquid medium is detectable by inspection of the cavity through the window.
 Suitably, the dissolvable or dispersible material is a dye.
 Suitably, the dissolvable or dispersible material is a substance which reflects radiation of wavelengths from 1 nm to 1 mm.
 Suitably, the dissolvable or dispersible material is a substance which fluoresces under incident radiation of wavelengths from 1 nm to 10 μm.
 Suitably, the dissolvable or dispersible material is disposed on at least one substrate.
 Suitably, the end fitting further comprises a housing disposed in the cavity and housing the dissolvable or dispersible material therein.
 Suitably, the housing comprises a cover disposed between the window and the dissolvable or dispersible material, to prevent viewing of the dissolvable or dispersible material housed in the housing through the window.

Suitably, the housing is configured to allow flow of liquid therethrough.

Suitably, the cavity comprises a radially outer portion and a radially inner portion and wherein the housing is disposed in the radially inner portion such that the radially outer portion is visible via the window.

Suitably, the housing is configured to allow flow of liquid from the radially inner portion to the radially outer portion.

Suitably, the window is mounted in a window surround.

Suitably, the window surround is integral with the end fitting.

Suitably, the window surround is disposed in a body of the end fitting.

Suitable, the end fitting further comprises a seal between the Jacket of the end fitting and the window surround.

Suitably, the window is retained in the window surround by a retaining ring. This is advantageous as the retaining ring can be removed from the window surround, allowing the window to be removed from the window surround. This is beneficial for replacing, repairing or cleaning the window.

According to a second aspect of the present invention, there is provided a method of adapting an end fitting for a flexible pipe, such that the end fitting comprises:
  a window;
  a cavity disposed in the end fitting radially inwards of the window and configured to be in fluid communication with an annulus of the flexible pipe, wherein at least a portion of the cavity is visible from the exterior of the end fitting via the window; and
  a dissolvable or dispersible material disposed within the cavity or in fluid communication with the cavity.

It will be appreciated that an end fitting for a flexible pipe may be adapted to include any of the features described herein in relation to the first aspect of the present invention.

According to a third aspect of the present invention, there is provided a method of detecting a flooding event in a flexible pipe comprising and end fitting, the method comprising:
  viewing a cavity in the end fitting of the flexible pipe through a window disposed radially outwards of the cavity, wherein the cavity is in fluid communication with an annulus of the flexible pipe;
  determining a colour of the cavity as viewed through the window and determining whether the colour of the cavity corresponds to a colour of a dissolvable or dispersible material disposed within the cavity or in fluid communication with the cavity; and
  determining that a flooding event has occurred if the colour of the cavity corresponds to the colour of the dissolvable or dispersible material.

Suitably, viewing the cavity comprises obtaining an image of the cavity via the window.

Suitably, the window is viewed remotely using a remotely operated vehicle.

Suitably, the method further comprises directing a radiation having a wavelength of from 1 nm to 1 mm, or from 1 nm to 10 μm into the cavity through the window.

It will be appreciated that the method of detecting a flooding event in a flexible pipe comprising and end fitting may be carried out using an apparatus having any of the features described herein in relation to the first aspect of the present invention.

Certain embodiments of the present invention provide for relatively easy detection of a flood event in a flexible pipe compared to previously known arrangements.

Certain embodiments of the present invention provide the advantage that the flood detection system is low cost compared to previous detection systems.

Certain embodiments of the present invention provide the advantage that the flood detection system is easily replaceable, at least prior to the flexible pipe installation.

Embodiments of the invention are further described hereinafter with reference to the accompanying drawings, in which.

In the drawings like reference numerals refer to like parts.

Figure 1:
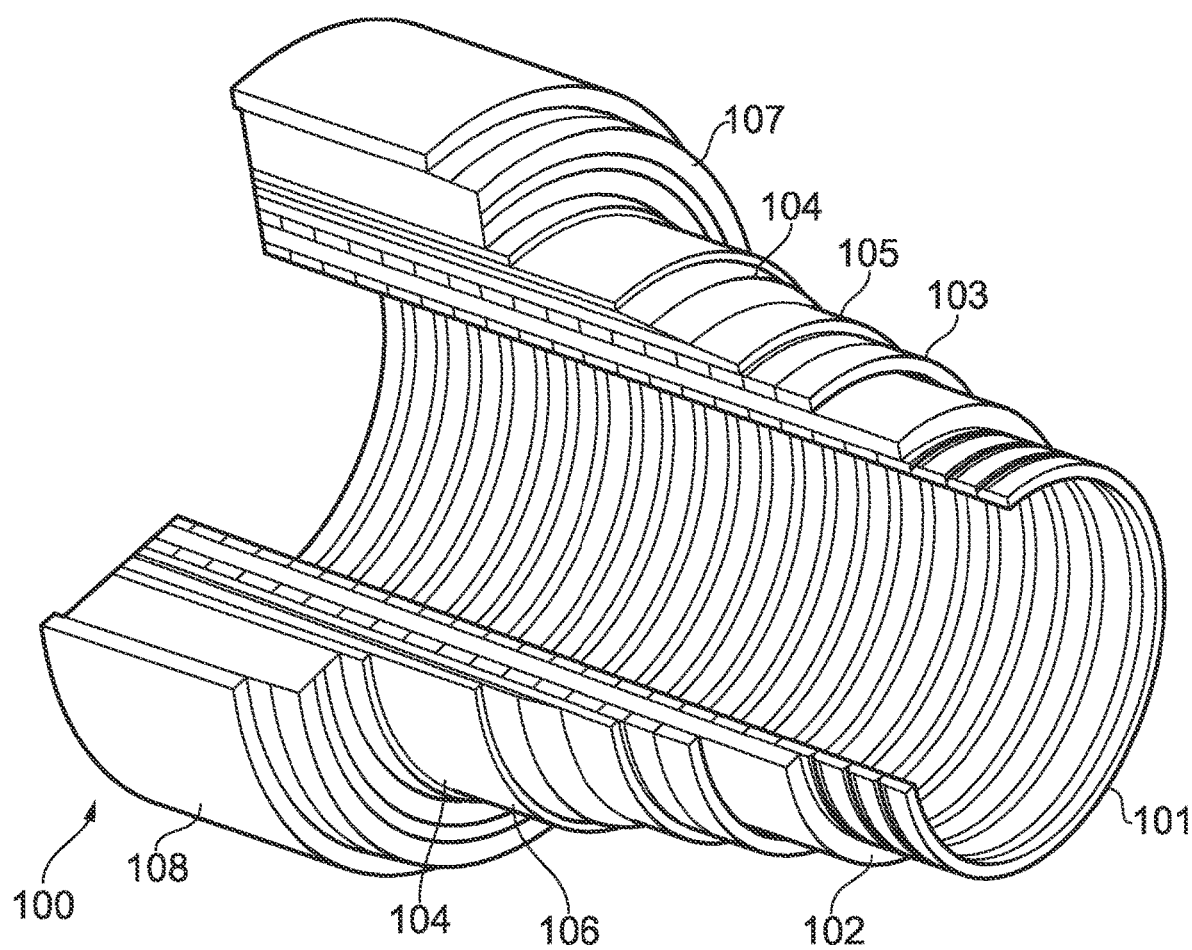
FIG. 1 illustrates a flexible pipe body.

Throughout this description, reference will be made to a flexible pipe. It will be understood that a flexible pipe is an assembly of a portion of pipe body and one or more end fittings in each of which a respective end of the pipe body is terminated. FIG. 1 illustrates how pipe body 100 is formed in accordance with an embodiment from a combination of layered materials that form a pressure-containing conduit. Although a number of particular layers are illustrated in FIG. 1, it is to be understood that the pipe body is broadly applicable to coaxial structures including two or more layers manufactured from a variety of possible materials. For example, the pipe body may be formed from polymer layers, metallic layers, composite layers, or a combination of different materials. It is to be further noted that the layer thicknesses are shown for illustrative purposes only. As used herein, the term "composite" is used to broadly refer to a material that is formed from two or more different materials, for example a material formed from a matrix material and reinforcement fibres.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. The carcass layer is often a metallic layer, formed from stainless steel, for example. The carcass layer could also be formed from composite, polymer, or other material, or a combination of materials. It will be appreciated that certain embodiments are applicable to 'smooth bore' operations (i.e. without a carcass layer) as well as such 'rough bore' applications (with a carcass layer).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer that increases the resistance of the flexible pipe to internal and external pressure and mechanical crushing loads. The layer also structurally supports the internal pressure sheath, and typically may be formed from an interlocked construction of wires wound with a lay angle close to 90°. The pressure armour layer is often a metallic layer, formed from carbon steel, for example. The pressure armour layer could also be formed from composite, polymer, or other material, or a combination of materials.

The flexible pipe body also includes an optional first tensile armour layer 105 and optional second tensile armour layer 106. Each tensile armour layer is used to sustain tensile loads and internal pressure. The tensile armour layer is often formed from a plurality of wires (to impart strength to the layer) that are located over an inner layer and are helically wound along the length of the pipe at a lay angle typically between about 10° to 55°. The tensile armour layers are often counter-wound in pairs. The tensile armour layers are often metallic layers, formed from carbon steel, for example. The tensile armour layers could also be formed from composite, polymer, or other material, or a combination of materials.

The flexible pipe body shown also includes optional layers of tape 104 which help contain underlying layers and to some extent prevent abrasion between adjacent layers. The tape layer may be a polymer or composite or a combination of materials.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
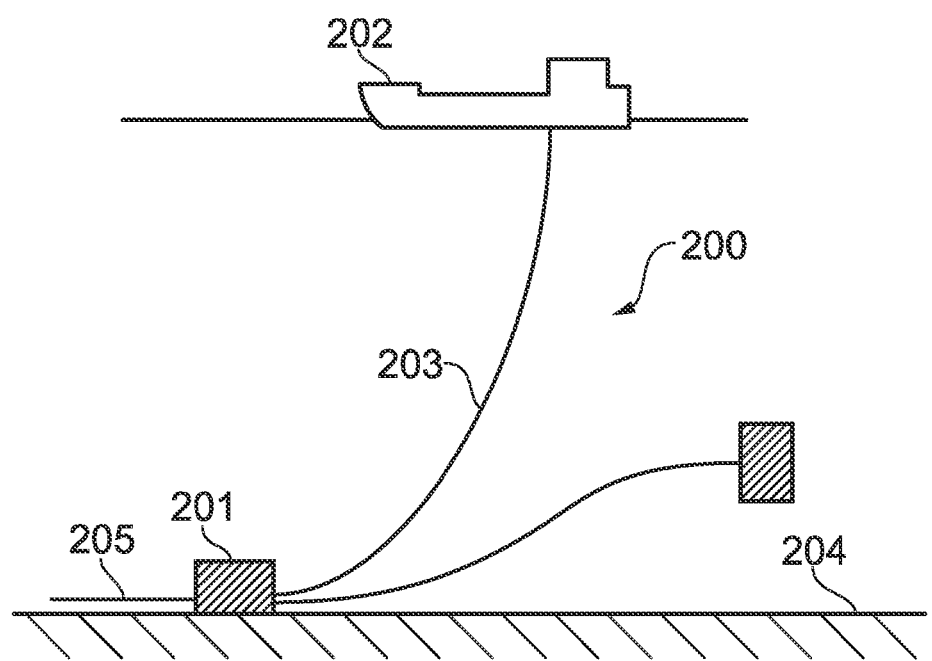
FIG. 2 illustrates a riser assembly.

FIG. 2 illustrates a riser assembly 200 suitable for transporting production fluid such as oil and/or gas and/or water from a sub-sea location 201 to a floating facility. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship 202. The riser assembly 200 is provided as a flexible riser, that is to say a flexible pipe 203 connecting the ship to the sea floor installation. The flexible pipe may be in segments of flexible pipe body with connecting end fittings.

It will be appreciated that there are different types of riser, as is well-known by those skilled in the art. Embodiments may be used with any type of riser, such as a freely suspended (free, catenary riser), a riser restrained to some extent (buoys, chains), totally restrained riser or enclosed in a tube (I or J tubes).

Figure 3:
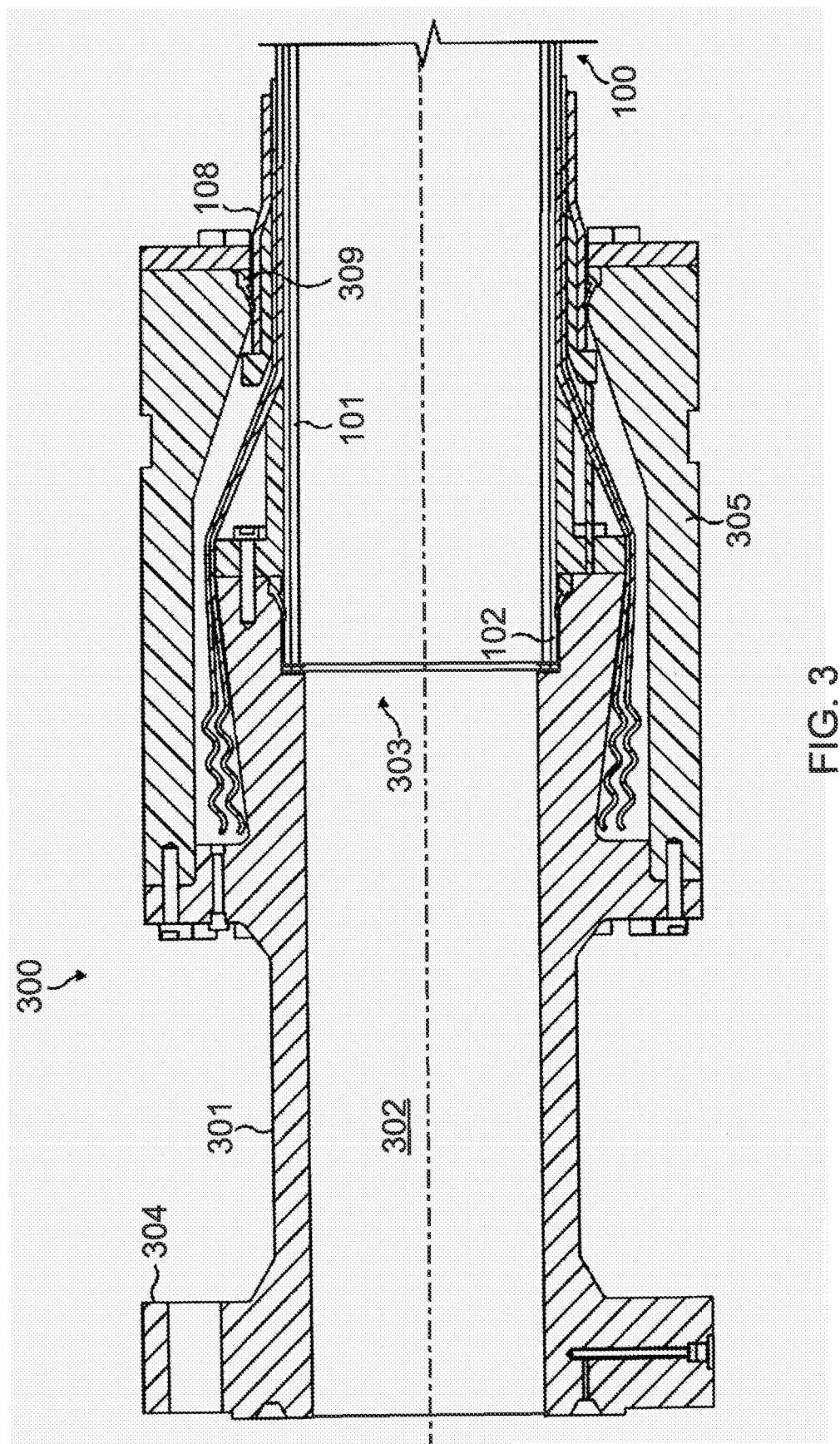
FIG. 3 illustrates an end fitting according to the prior art.
Figure 4:
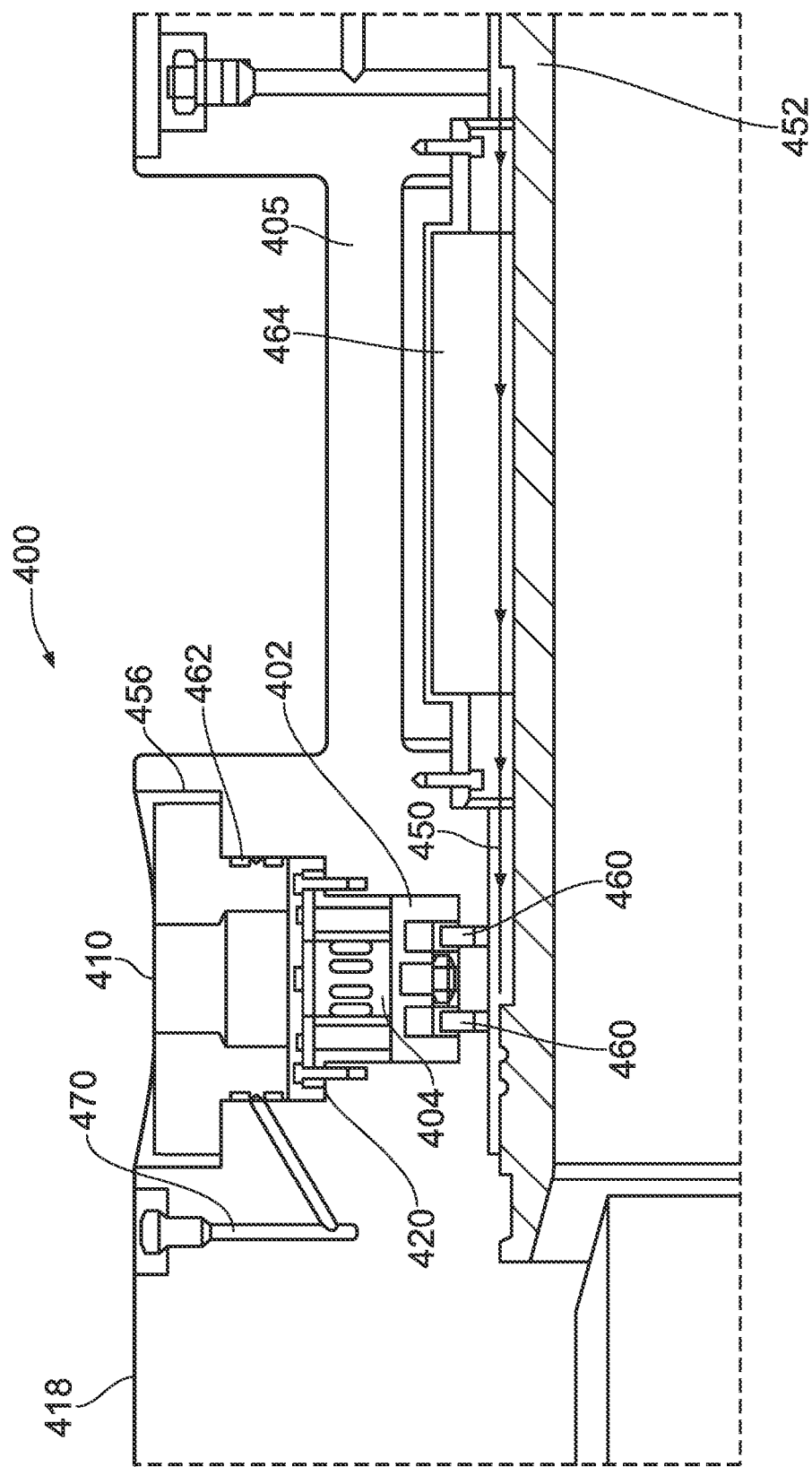
FIG. 4 illustrates a sectional view of a portion of an end fitting.
Figure 5:
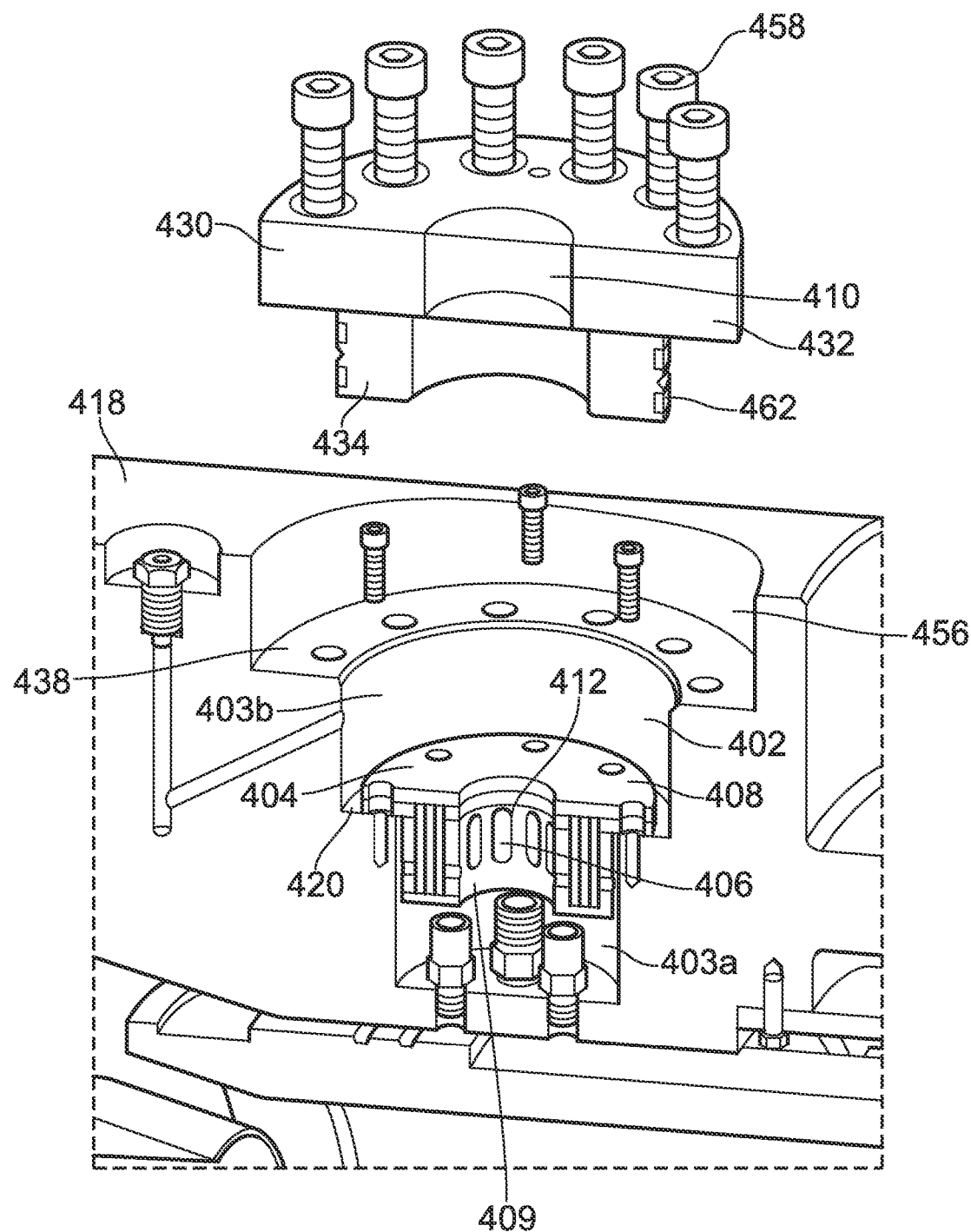
FIG. 5 illustrates an exploded view of a section of an end fitting.
Figure 7:
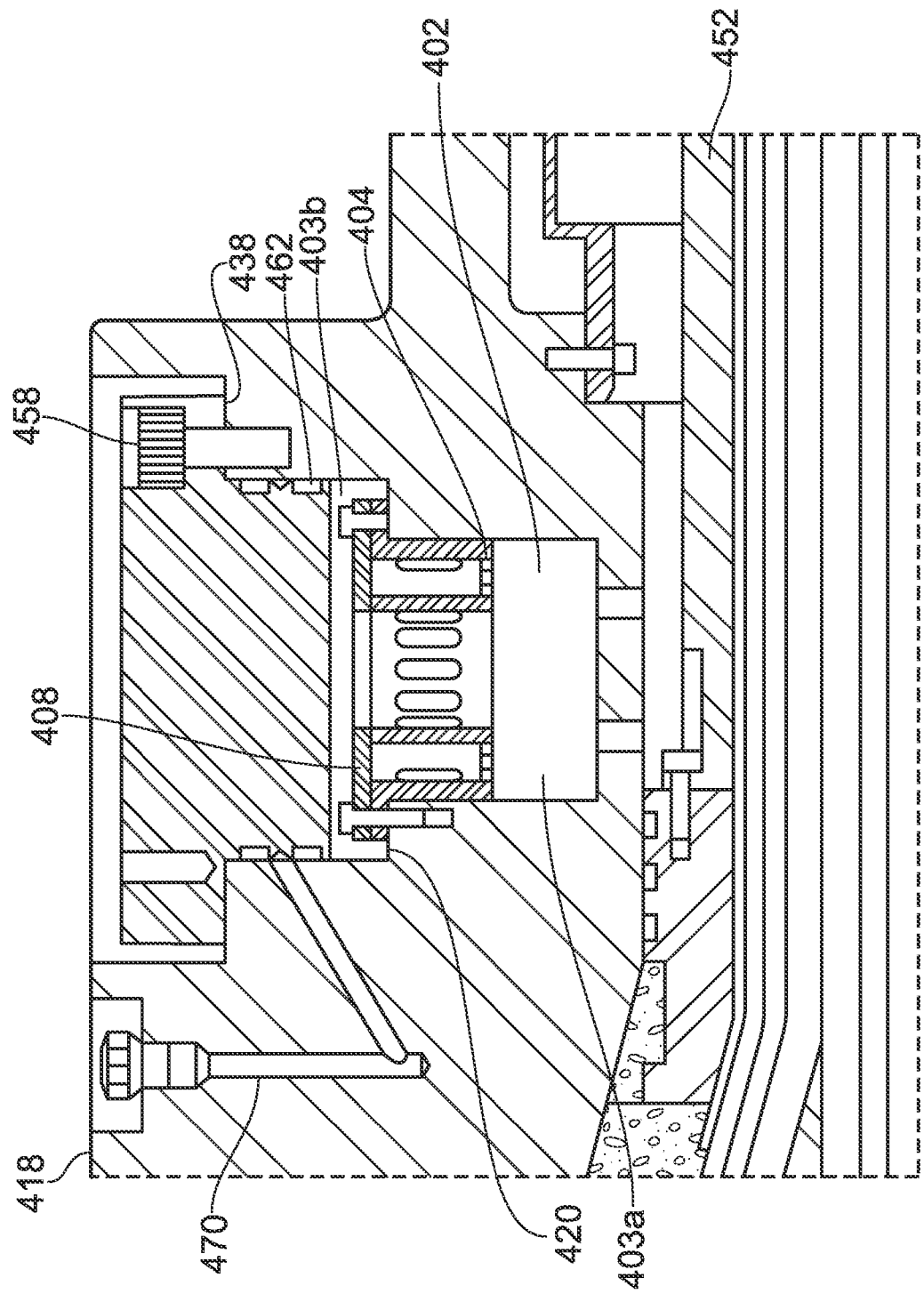
FIG. 7 illustrates an enlarged sectional view of a portion of an end fitting.

FIGS. 4, 5 and 7 illustrate a portion of an end fitting 400. The end fitting 400 may be part of a flexible pipe including a flexible pipe body with the end fitting coupled to the flexible pipe body. The end fitting 400 may be configured to terminate layers of the flexible pipe body as known in the art and described above in relation to FIG. 3.

The end fitting 400 includes a window 410 and a cavity 402. The cavity 402 is disposed radially inwards of the window and is configured to be in fluid communication with an annulus of the flexible pipe. The annulus of the flexible pipe is the region defined between an inner layer (e.g. the internal pressure sheath) and an outermost layer (e.g. the outer sheath) of the flexible pipe.

In this example a fluid passageway 450 is defined between an outer sleeve 452 of the end fitting and a jacket 405 of the end fitting. The fluid passageway 450 fluidly couples the annulus of the flexible pipe to the cavity 402. That is, fluid from the annulus of the flexible pipe may reach the fluid passageway 450 via gaps between the tensile armour wires of the flexible pipe body. Fluid from the annulus may pass around an end region of the outer sleeve 452 to enter the passageway 450.

Optionally, the fluid passageway 450 may also pass through a further cavity 464 in a neck region of the end fitting jacket 405, which may allow for detection of fluid in the passageway (and therefore detection of a flood event) through ultrasound scanning. Such ultrasound flood detection is known in the art, and for brevity will not be described in detail.

In this example, the fluid passageway 450 is fluidly coupled to the cavity 402 via at least one one-way valve 460. In this example two one-way valves couple the fluid passageway to the cavity 402. The one-way valves 460 are configured to allow fluid flow from the fluid passageway 450 to the cavity 402.

The window 410 is aptly disposed on an outer surface region 418 of the end fitting 400 and is radially outwards of the cavity 402. The window 410 enables visual inspection of the cavity 402 from outside of the end fitting 400. Aptly, the window is transparent.

The window 410 may be mounted in a window surround 430. The window surround 430 may include a flange 432 surrounding the window 410 and a main body 434 extending radially inwards from the flange 432. The flange 432 and the main body 434 may be integrally formed or may be coupled together via any suitable means, for example via bolts. The window 410 and window surround 430 are aptly configured to withstand pressures of around 300 Bar, for example. For example, the window may have a thickness of from 20 to 75 mm, and preferably at least 30 mm, to provide sufficient strength to withstand subsea pressures.

The window 410 may be mounted in the window surround 430 in any suitable manner. In this example, the window and window surround is a METAGLAS® Sight Window from UK supplier Visilume Ltd and includes a metal ring surrounding a glass window.

The end fitting jacket 405 includes a recess 456 in the outer surface 418 that is configured to receive the flange 432 of the window surround 430. The recess 456 is disposed radially outwards of the radially outer portion 403b of the cavity 402. The recess 456 has a cross-sectional area larger than the cross-sectional area of the radially outer portion 403b of the cavity 402.

The radially outer portion 403b of the cavity 402 is configured to receive the main body 434 of the window surround 430. Aptly the main body 434 of the window surround 430 is sized and shaped to correspond to the size and shape of the radially outer portion 403b of the cavity 402. In this way, the main body 434 of the window surround 430 may be sealed against the jacket 405 of the end fitting. In this example, the end fitting 400 includes two O-ring seals 462 disposed between the window surround 430 and the end fitting jacket 405.

A window support surface 438 is defined around radially outer portion 403b of the cavity 402. In this example the window support surface 438 is an annular support surface surrounding the radially outer portion 403b of the cavity 402 and defines the bottom of the recess 456.

The flange 432 of the window surround 430 may be supported and coupled to the window support surface 438 to thereby couple the window 410 and window surround 430 to the end fitting jacket 405. In this example, the window surround 430 is coupled to the end fitting jacket 405 via a plurality of bolts 458 extending through the flange 432 and into the support surface 438. In other examples, the window surround 430 may be coupled in any other suitable manner or may be integral with the end fitting jacket 405.

A test port 470 may be provided in the end fitting jacket 405 to allow for testing of the integrity of the seal between the window surround 430 and the end fitting jacket 405. In this example the test port 470 extends from the outer surface 418 of the end fitting jacket 405 to a space between the two O-ring seals 462. Fluid may be supplied to the test port 470 under pressure to test the integrity of the O-ring seals 462.

With the window 410 in place in the end fitting 400, the cavity 402 may be viewed via the window 410.

A dissolvable or dispersible material may be disposed within the cavity 402. In other examples, the dissolvable or dispersible material may be disposed in fluid communication with the cavity 402 (for example, in a region of the end fitting 400 fluidly coupled to the cavity 402).

Upon contact with a liquid medium, for example water, the dissolvable or dispersible material is configured to dissolve or disperse in the liquid medium. In this way, liquid medium in the cavity 402 may be detectable by inspection of the cavity 402 through the window 410.

In one example, the dissolvable or dispersible material may be a dye. The dye may be configured to dissolve or disperse in a liquid medium to thereby change the colour of the liquid medium such that it is visible. In this way, it is possible to detect the presence of a liquid in the cavity 402 by visual inspection of the cavity 402 through the window 410.

Presence of a liquid in the cavity 402 may be indicative of a flooding event in the flexible pipe. For example, in the event that the outer sheath fails, liquid medium (e.g. sea water) surrounding the flexible pipe may enter the annulus of the flexible pipe through the outer sheath. Since the annulus is in fluid communication with the cavity 402, the sea water will also enter the cavity. The dissolvable or dispersible material that is either disposed within the cavity 402 or is in fluid communication with the cavity 402 will dissolve or disperse in the sea water once in contact therewith. In the case that the dissolvable or dispersible material is a dye, the dye will colour the sea water such that the sea water is visible in the cavity 402 by viewing the cavity through the window 410.

Figure 6A:
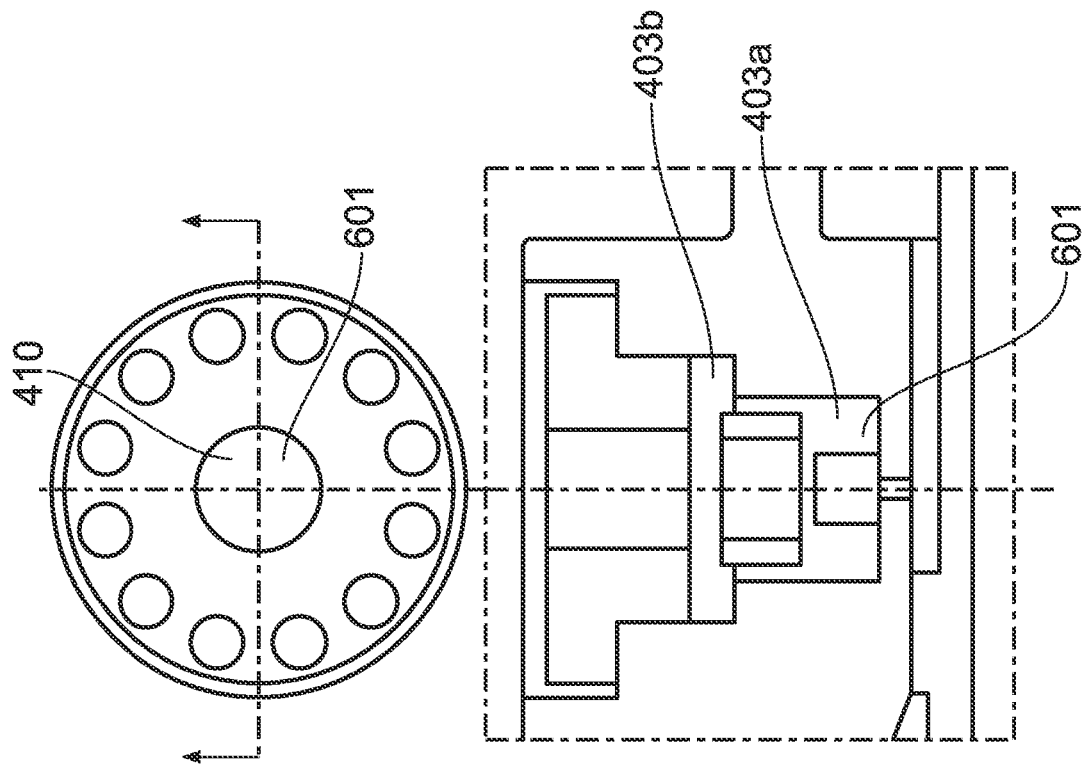
FIG. 6a illustrates a portion of an end fitting before a flooding event.
Figure 6B:
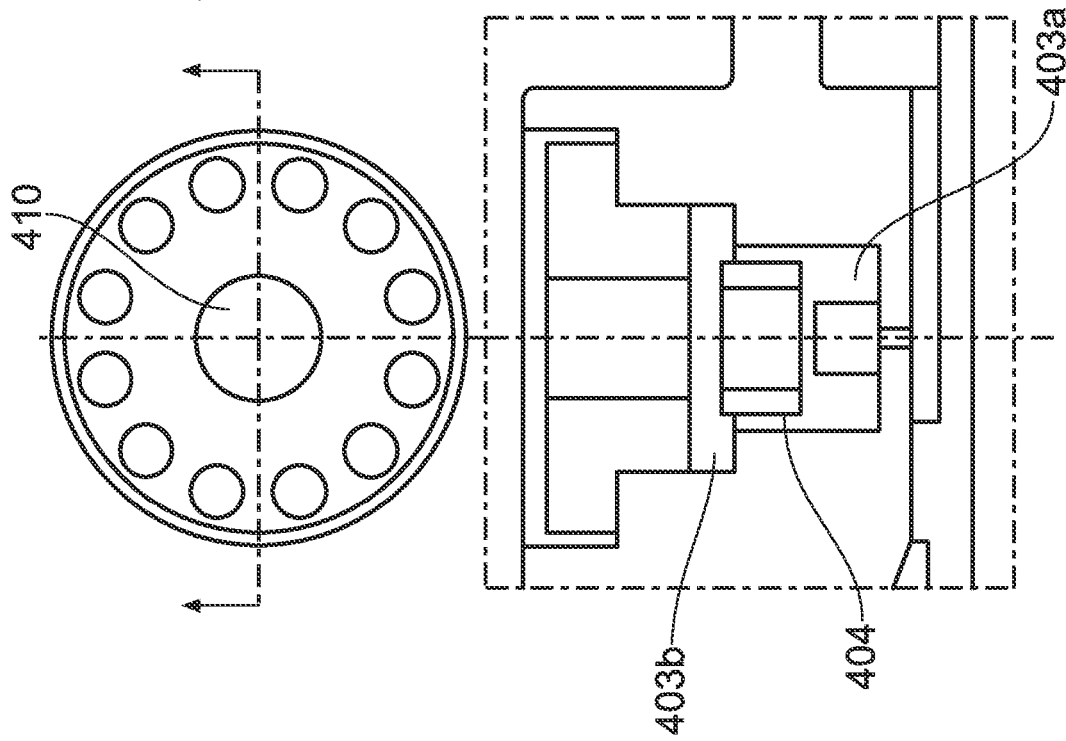
FIG. 6b illustrates a portion of an end fitting after a flooding event.

FIGS. 6a and 6b illustrate the window 410 and the cavity 402 before and after a flooding event. As shown in FIG. 6a, before a flooding event the cavity 402 does not contain any liquid medium. As shown in FIG. 6b, after a flooding event the cavity 402 contains liquid medium 601 that has been coloured by a dye disposed within or in fluid communication of the cavity.

Referring again to FIGS. 4, 5 and 7, in this example the end fitting 400 further includes a housing 404 disposed within the cavity 402. The housing 404 is configured to house the dissolvable or dispersible material therein.

The housing 404 is configured to allow flow of liquid therethrough such that liquid medium may come into contact with the dissolvable or dispersible material disposed within the cavity 402. In this example, the housing 404 includes a plurality of apertures or vents 406 each configured to allow flow of liquid into and out of the housing 404.

By disposing the dissolvable or dispersible material within the housing 404, the dissolvable or dispersible material can be contained or held in position until the cavity is flooded with liquid medium. Furthermore, the housing 404 may be configured to prevent viewing of the dissolvable or dispersible material through the window before a flooding event has occurred. This can help to prevent incorrect or false detection of a flooding event.

In this example, the housing 404 includes a cover 408 on a radially outer portion thereof. The housing 404 also includes a housing main body 409 extending radially inwards from the cover 408. The cover 408 is disposed between the window and the dissolvable or dispersible material housed within the housing 404. In this way, the cover 408 prevents viewing from the window of the dissolvable or dispersible material that is housed in the main body 409 of the housing 404. As such, the colour of the dissolvable or dispersible material may be obscured from view by the cover 408 until it has dissolved or dispersed in a liquid medium that enters the cavity 402.

The cover 408 may aptly be coloured a colour different to the dissolvable or dispersible material. For example, the cover 408 may be white whilst the dissolvable or dispersible material may have a colour different to white, for example yellow. In this way, when viewing the cavity 402 through the window 410, if the colour viewed is white this may indicate that a flooding event has not occurred. On the other hand, if the white cover is not visible through the window, this may indicate that a liquid is present in the cavity 402 and therefore a flooding event has occurred. It will be appreciated that the colour of the cover 408 is not limited to white and may be any colour different to the colour of the dissolvable or dispersible material. In this example, the cavity 402 includes a radially inner portion 403a and a radially outer portion 403b. The radially inner portion 403a is continuous with and in fluid communication with the radially outer portion 403b.

As shown best in FIG. 5, the radially inner portion 403a of the cavity 402 may have a smaller cross-sectional area that the radially outer portion 403b. A support surface 420 is located between the radially inner portion 403a and the radially outer portion 403b and surrounds the opening of the radially inner portion 403a of the cavity 402. In this example, the radially outer portion 403b has a circular cross-section and the support surface 420 is annular in shape.

In this example, the main body 409 of the housing 404 is disposed in the radially inner portion 403a of the cavity 402. In this way, the radially outer portion 403b of the cavity 402 is visible through the window 410, whereas the radially inner portion 403*a* is substantially obscured from view by the housing 404.

An outer portion of the housing 404 may be configured to couple with the support surface 420. For example, the outer portion of the housing 404 may be bolted or screwed or adhered or otherwise coupled to the support surface 420. In this example the cover 408 of the housing 404 is the outer portion and is coupled to the support surface 420 via bolts. The housing main body 409 extends radially inwards of the cover 408 into the radially inner portion 403*a* of the cavity 402.

The housing main body 409 may aptly be sized and shaped to correspond to the size and shape of the radially inner portion 403*a* of the cavity 402. In this example, the housing main body 409 is substantially cylindrical and has a diameter substantially equal to or slightly less than the diameter of the radially inner portion 403*a* of the cavity 402.

The housing 404 is configured to allow flow of liquid from the radially inner portion 403*a* of the cavity 402 to the radially outer portion 403*b* of the cavity 402. In this example, the housing 404 includes a central aperture 412 extending therethrough. The central aperture 412 provides a fluid flow path between the radially inner portion 403*a* and the radially outer portion 403*b*. In other words, the radially inner portion 403*a* and the radially outer portion 403*b* are fluidly coupled via the central aperture 412 of the housing.

The housing 404 may be formed from a metal, ceramic, composite, or polymer, for example, low alloy or stainless steel, or nickel alloy 625, or PET, polyamide or PTFE, carbon fibre reinforced polymer, glass fibre/epoxy composite, etc. In one example, the housing may be formed from a mesh, for example a metal or polymer mesh. The mesh may be configured to retain the dissolvable or dispersible material therein until dissolved or dispersed in a liquid medium that may enter the housing 404 through the mesh. Alternatively the housing may essentially be a pouch or a dissolvable material, such as PVA, which itself dissolves in contact with water then releases its contents, in this case a dye.

Although in the example described above, the dissolvable or dispersible material is a dye, in other examples the dissolvable or dispersible material may include a different material that may dissolve or disperse into a liquid medium to indicate the presence of a liquid in the cavity 402. For example, the dissolvable or dispersible material may be a substance that reflects radiation of wavelengths from 1 nm to 1 mm. In this way, the dissolvable or dispersible material may reflect radiation in the UV spectrum, the visible spectrum, the infrared spectrum and the microwave spectrum. For example, the dissolvable or dispersible material may include Rhodamine VVT dyes, (available from Organic Dyes & Pigments LLC, Rhode Island, USA), glass microspheres, nanoparticles of glass or carbon, or salt crystals of calcium, sodium, titanium or copper. Suitable detectors may be used to detect the reflected radiation from the dissolvable or dispersible material when inspecting the cavity 402 through the window 410.

In another example, the dissolvable or dispersible material may be a substance configured to fluoresce under incident radiation of wavelengths from 1 nm to 10 µm. That is, the dissolvable or dispersible material may be a substance configured to fluoresce under incident radiation generally in the UV spectrum, or the visible spectrum. For example, the dissolvable or dispersible material may include Orcoacid fluorescein dyes, or fluorescent OrcoSolve dyes (available from Organic Dyes & Pigments LLC, Rhode Island, USA).

When viewing the cavity 402, incident radiation of suitable wavelength may be directed through the window 410 into the cavity 402. If a liquid medium is present in the cavity 402 with the dissolvable or dispersible material dissolved or dispersed therein, then the cavity 402 will appear to fluoresce under the incident radiation, thereby indicating the presence of the liquid medium and therefore a flooding event.

Figure 8A:
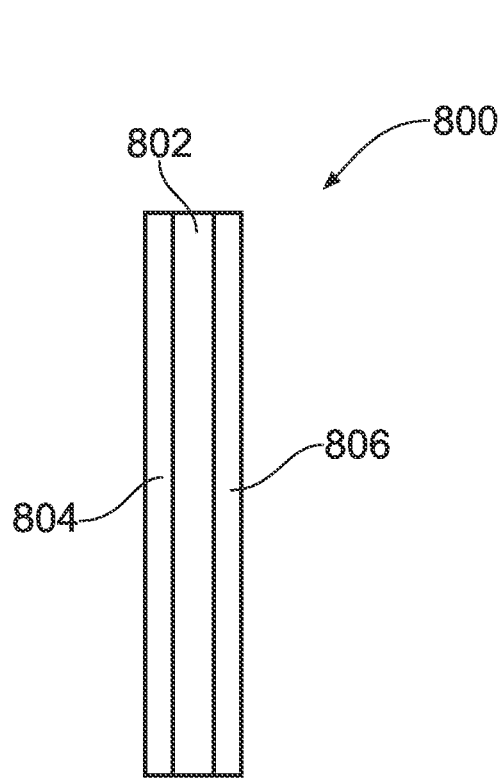
FIG. 8a illustrates an example substrate on which a dissolvable or dispersible material is disposed.
Figure 8B:
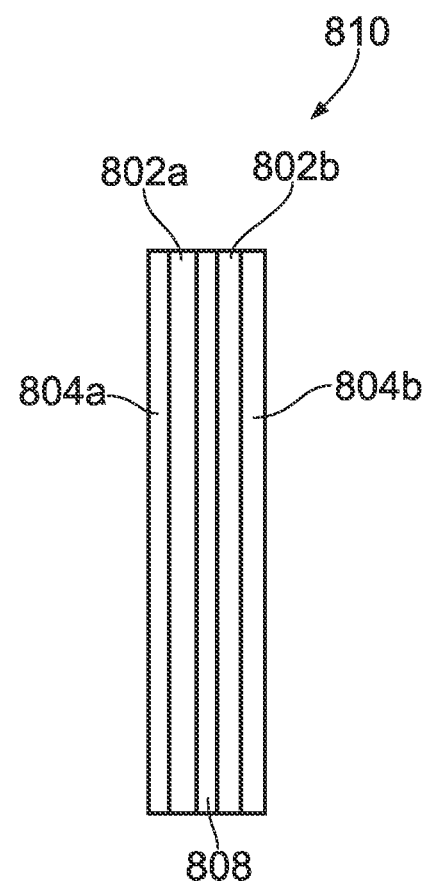
FIG. 8b illustrates another example substrate on which a dissolvable or dispersible material is disposed.

FIGS. 8*a* and 8*b* illustrate two examples of how the dissolvable or dispersible material may be retained in the housing 404. In each of these examples, the dissolvable or dispersible material is disposed on a substrate. One or more substrate having the dissolvable or dispersible material disposed thereon may be positioned within the cavity 402 or within fluid communication of the cavity 402, for example inside the housing 404.

FIG. 8*a* shows a cross section of an example of a substrate 800. The dye substrate 800 includes a central layer 802. The central layer 802 is sandwiched between a pigment layer 804 and a backing layer 806.

In this example, the pigment layer 804 includes a coating and a pigment. The pigment may include the dissolvable or dispersible material. The coating of the pigment layer 804 may be disposed on the central layer and the pigment may then be disposed on the coating to form the pigment layer 804. In this way, the pigment is disposed on an outer surface of the substrate 800 such that the pigment may contact a liquid in a flooding event so as to dissolve or disperse in the liquid.

The central layer 802 may include a film. For example, the central layer 802 may be a polyester film. In this example the central layer is a crystal clear polyester film.

The coating may be a chemical which chemically treats the central layer 802 so as to promote pigment adhesion. In this way, the pigment may be adhered to the central layer 802 as a pigment layer 804.

The pigment may be a water soluble dye or a food colouring, for example. In this example the pigment is E102, tartrazine (a sodium salt derivative). The dye can be activated by contact with water. The dye dissolves or disperses into the water and colours the water. In this example, the dye colours the water yellow. The dye is aptly soluble in both fresh and salt water.

A backing layer 806 is disposed on the central layer 802. The backing layer 806 is situated on the opposite side of the central layer 802 to the pigment layer 804. In this example, the backing layer 806 is a releasable liner with a self-adhesive film between the liner and the central layer 802. The liner may be removed to adhere the substrate 412 to a surface, for example an inner surface of the housing 404 or the cavity 402.

FIG. 8*b* illustrates a cross section of an alternative substrate 810. In this example a joining layer 808 is sandwiched between a first central layer 802*a* and a second central layer 802*b*.

On the opposite side of the first central layer 802*a* to the joining layer 808 is a first pigment layer 804*a*. Likewise, on the opposite side of the second central layer 802*b* to the joining layer 808 is a second pigment layer 804*b*. The central layers 802, and pigment layers 804 may be configured similarly to those described above and as such, for brevity will not be described again in detail.

The joining layer 808 may be, for example, a double sided adhesive layer. The joining layer 808 couples the first and second central layers 802*a*, 802*b* together. In this way, a pigment is provided on both the front and rear surfaces of the substrate 810. Thus, providing a greater surface area of pigment for contacting and dissolving or dispersing into a liquid medium.

It will be appreciated that although in the examples above a dye is disposed on the substrates, in other examples, any other dissolvable or dispersible material described herein may also be disposed on a suitable substrate.

Together, the window 404, the cavity 402 and the dissolvable or dispersible material form a visual flood detection system. The visual flood detection system may be utilised in combination with or instead of an ultrasound flood detection system. For example, where ultrasound detection in the ultrasound flood detection system is not possible, the visual flood detection system may be used instead. In the alternative, the end fitting may only include a visual flood detection system and no ultrasound flood detection system. As a further alternative it will be understood that the dye may be disposed or contained remotely from, but in fluid communication with the cavity 402, either in another suitable cavity in another region of the end fitting, or within the flexible pipe body (incorporated into a pipe body layer, for instance contained within a sacrificial pipe layer which itself comprises a material which is soluble in contact with a solvent medium in order to release the dye in situ, the dye then to be communicated to the cavity 402 by the solvent medium; see EP3003715B1 for more on such a pipe body layer).

Figure 11:
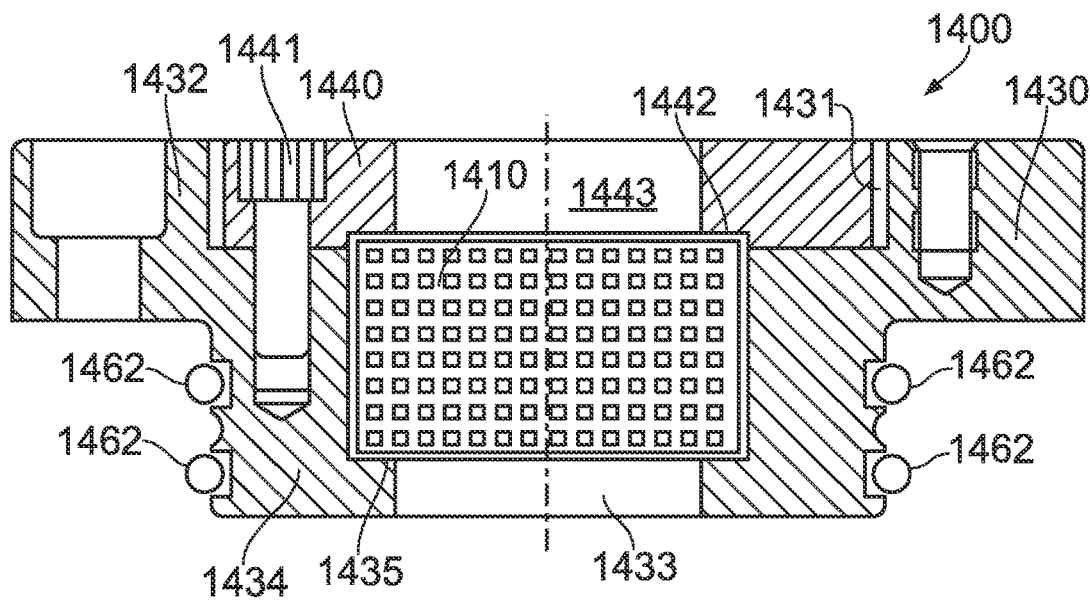
FIG. 11 illustrates an alternative window assembly for use in an end fitting.
Figure 12:
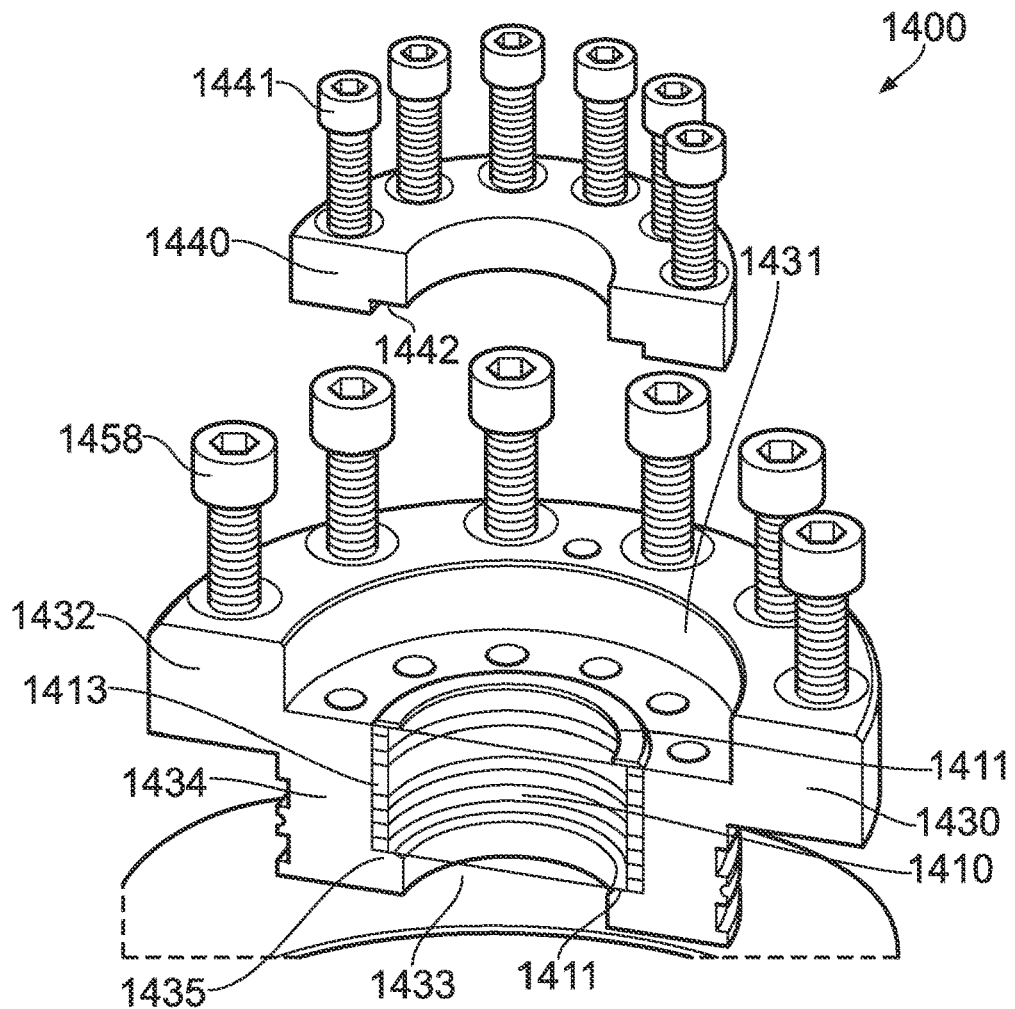
FIG. 12 illustrates an exploded, section view of the window assembly of FIG. 11.

Turning now to FIGS. 11 and 12 an alternative window assembly 1400 is shown. The window assembly 1400 comprises a window surround 1430 which is annular in shape. The window surround 1430 has the same radially outer shape as the window surround 430 in the previous embodiment. Accordingly, the radially outer portion 403b of the cavity 402 is configured to receive a main body 1434 of the window surround 1430 and the recess 456 in the outer surface 418 is configured to receive the flange 1432 of the window surround 1430. In this way, the window assembly 1400 can directly replace the window surround 430 and window 410 of the previous embodiment. Common or similar features between the alternative window surround 1430 and the window surround 430 of the previous embodiment are denoted with a preceding '1'. For brevity, only differences are described herein.

The window surround 1430 has an opening 1433 extending along the axis thereof. The diameter of the opening 1433 is smallest at or towards a lower surface of the window surround 1430, which is inside of the cavity 402 in use. This provides a lower shoulder 1435 in the opening 1433. The diameter of the opening 1433 is greatest at the top surface of the window surround 1430. This provides a circular recess 1431 on the top surface of the window surround 1430. The opening 1433 has a constant diameter between the lower shoulder 1435 and the circular recess 1431.

The window assembly 1400 also has a window 1410. The window 1410 is cylindrical in shape with a diameter substantially equal to or less than the diameter of the opening 1433 between the lower shoulder 1435 and the circular recess 1431. In this example the height of the window 1410 is greater than the distance between the lower shoulder 1435 and the axially inner face of the circular recess 1431. However, the height of the window 1410 may be substantially the same as the distance between the lower shoulder 1435 and the axially inner face of the circular recess 1431. The window 1410 is transparent or translucent and is preferably manufactured from glass or another clear, transparent ceramic or crystalline mineral material.

A sealing washer 1411 is located or locatable on the top surface of the window 1410 and a sealing washer 1411 is located or locatable on the bottom surface of the window 1410. The outer diameter of each sealing washer 1411 is substantially the same as the diameter of the window 1410. In this example, the inner diameter of each sealing washer 1411 is substantially the same as the diameter of the opening 1433 of the window surround 1430. The sealing washers 1433 may be attached to the window 1410, for example via an adhesive, or may be located on the window 1410 during assembly of the window assembly 1400.

A window gasket 1413 is located or locatable on the circumferential surface of the window 1410. The sealing gasket 1413 has a height which is less than or equal to the height of the window 1410. The sealing gasket 1413 might be attached to the window 1410, for example via adhesive or may be located on the window 1410 during assembly of the window assembly 1400.

The window assembly 1400 also has a retaining ring 1440. The retaining ring 1440 has an outer diameter which is less than the inner diameter of the circular recess 1431. The internal diameter of the retaining ring 1440 is smaller than the diameter of the window 1410. The internal diameter of the retaining ring 1440 is substantially the same as the internal diameter of the opening 1433 between the lower shoulder 1435 and the circular recess 1431. Optionally, on the inner edge of the bottom surface of the retaining ring 1440 there is a step to provide a retaining shoulder 1442. The outer diameter of the retaining shoulder 1442 is the same as or greater than the diameter of the opening 1433 between the lower shoulder 1435 and the circular recess 1431.

Assembly of the window assembly 1400 is now described. The window 1410 is inserted into the opening 1433 in the window surround 1430 such that one of the sealing washers 1411 is located between the lower surface of the window 1410 and the upper surface of the lower shoulder 1435, and the window gasket 1413 is located between the circumferential surface of the window 1410 and the radially inner surface of the opening 1433. The outer diameter of the window 1410 and the thickness of the window gasket 1410 are such that the gasket is compressed, to create a fluid seal between the window 1410 and the window surround 1430. The retaining ring 1440 is assembled into the circular recess 1431 such that the second sealing washer 1411 is located between the upper surface of the retaining shoulder 1442 and the top surface of the window 1410. The retaining ring 1440 is secured to the window surround 1430 via a plurality of bolts 1441. If, instead, the height of the window 1410 is substantially the same as the distance between the lower shoulder 1435 and the axially inner face of the circular recess 1431, then no retaining shoulder 1442 may be present on the retaining ring 1440. In this case the second sealing washer 1411 is located between the lower surface of the retaining ring 1440 and the upper surface of the window 1410.

The sealing washers 1411 and window gasket 1413 prevent fluid from flowing between the window surround 1430 and the window 1410, and between the retaining ring 1440 and the window 1410. In this way, the window assembly 1400 is fluidly sealed.

When the window assembly is installed in to the end-fitting 405, the cavity 402 is viewed through the window 1410 as in the previous embodiment.

The window assembly 1400 is advantageous over the window assembly of the previous embodiment as the window 1410 is not fused to the window surround 1430, and so the cost of manufacturing is lower, and assembly is simpler. Furthermore, the window assembly 1400 is advantageous because the window 1410 can be removed from the window surround 1430. This allows the window 1410 to be replaced, repaired or cleaned more easily.

Figure 9A:
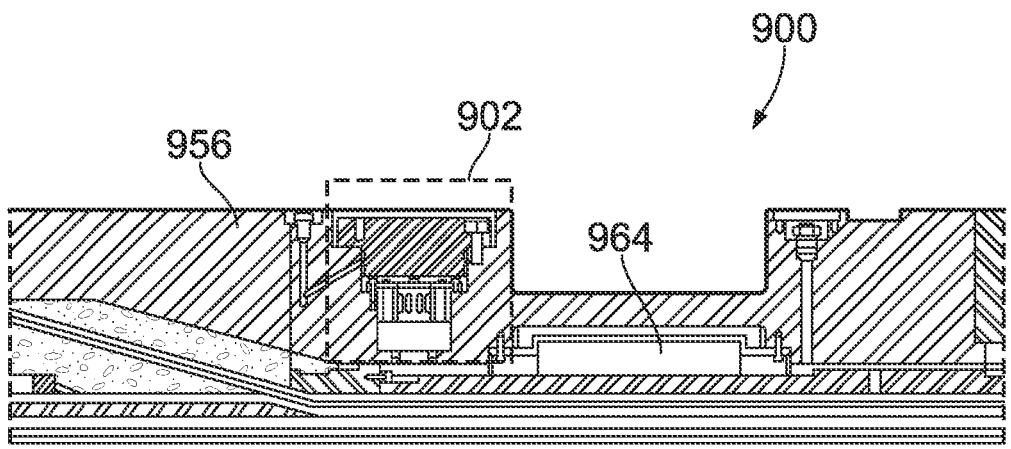
FIG. 9a illustrates a sectional view of an end fitting including a window.

As illustrated in FIG. 9a the visual flood detection system 902 may be disposed in the end fitting jacket 956 of the end fitting 900. Optionally, ultrasound flood detection system 964 may be provided in a neck region of the end fitting 900 adjacent to the visual flood detection system 902.

Each of the layers of the flexible pipe body are terminated in the end fitting 900 as known in the art. The outer sleeve of the end fitting 900 is positioned beneath the outer sheath such that the fluid passageway 450 may be in fluid communication with the annulus of the flexible pipe body.

Figure 9B:
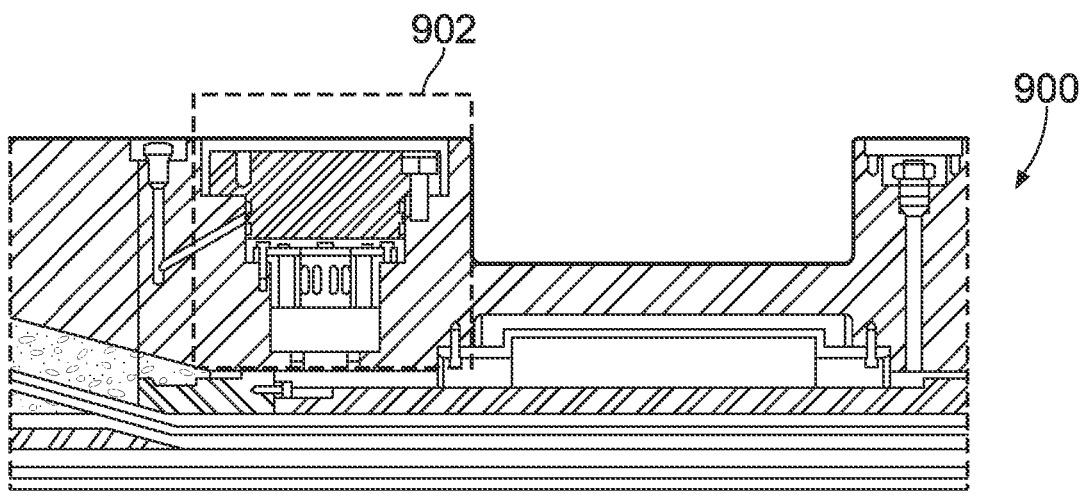
FIG. 9b illustrates a sectional view of an end fitting including a window and a further window.
Figure 9B:
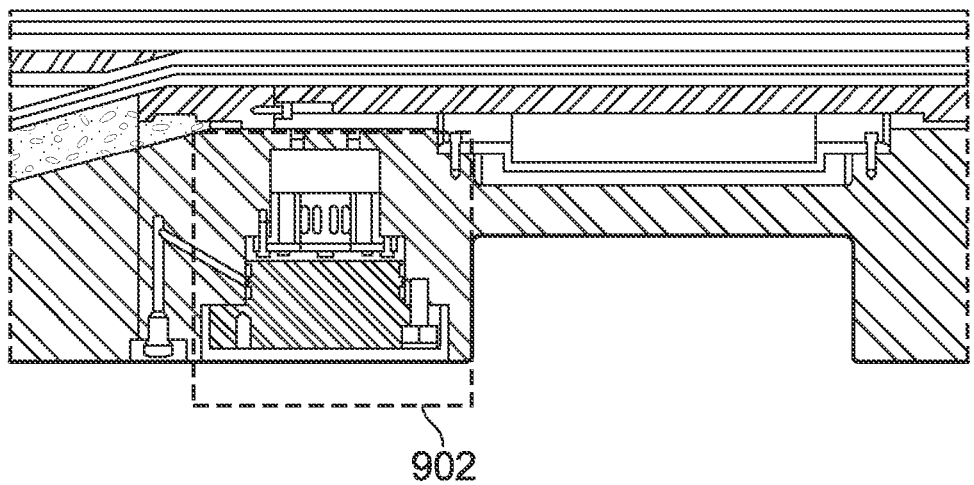

As illustrated in FIG. 9b, the end fitting 900 may include a plurality of visual flood detection systems 902. In this example, the end fitting 900 includes visual flood detection systems 902 equally spaced around the circumference of the end fitting 900. Aptly, the end fitting 900 may include three visual flood detection systems 902 equally spaced around the circumference of the end fitting 900. This may be beneficial to ensure that one of the flood detection systems is always accessible, for example if the other flood detection systems are resting on or buried under the sea bed. In other examples, the end fitting 900 may include at least one flood detection system 902, or aptly at least three flood detection systems 902, for example.

Figure 10:
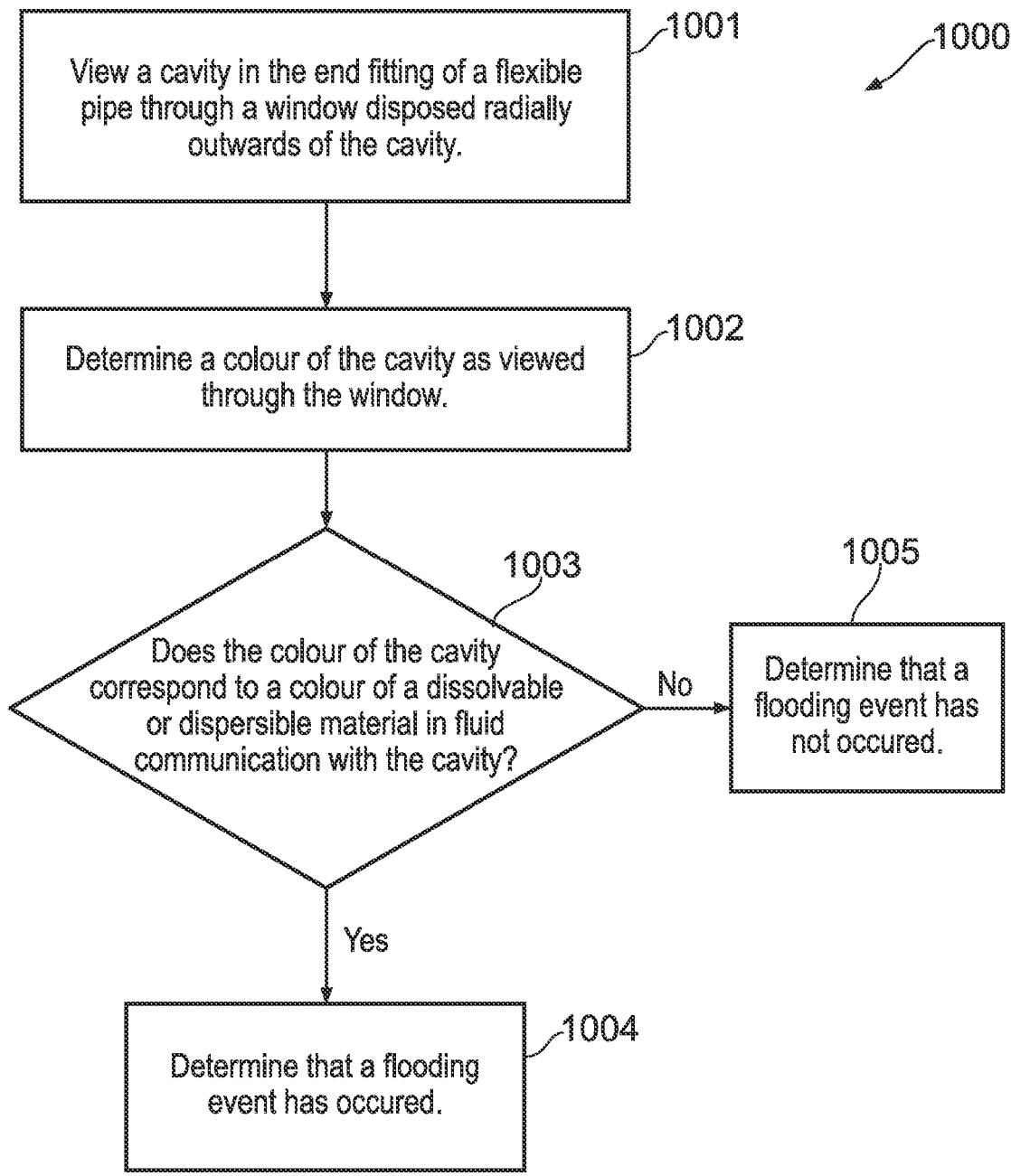
FIG. 10 illustrates a method of detecting a flooding event in a flexible pipe.

FIG. 10 illustrates a method 1000 of detecting a flooding event in a flexible pipe. At step 1001 the cavity 402 is viewed through the window 410, which is disposed radially outwards of the cavity 402.

The cavity 402 may be viewed manually, for example by a diver diving to the end fitting and looking through the window (in shallow water). Alternatively, a remotely operated vehicle (ROV) may be deployed to the end fitting and may view the cavity 402 through the window 410, e.g. using an appropriate camera or other image capture device. The ROV may be configured to clean the window 410, e.g. using a water jet, prior to viewing the cavity 402 through the window 410.

Where the dissolvable or dispersible material is reflects radiation outside the visible spectrum, an appropriate detector, e.g. a UV or infrared camera, may be used to view the cavity 402 through the window 410. Similarly, where the dissolvable or dispersible material is a material that fluoresces under incident radiation, the viewing may include providing incident radiation of appropriate wavelength to the cavity 402 through the window 410.

The method 1000 further includes at step 1002 determining a colour of the cavity 402 as viewed through the window. The colour of the cavity 402 may be determined by a diver, by an ROV or by a user at a remote location analysing images captured by the ROV.

At step 1003 it is determined whether the colour of the cavity 402 as viewed through the window 410 corresponds to the colour of the dissolvable or dispersible material disposed within or in fluid communication with the cavity 402. For example, where the dissolvable or dispersible material is known to be yellow, it is determined whether the cavity is yellow in colour. Similarly, if the dissolvable or dispersible material is known to fluoresce under incident radiation in the UV spectrum, it is determined whether the dissolvable or dispersible material fluoresces under incident radiation in the UV spectrum.

At step 1004, if it is determined that the colour of the cavity 402 corresponds to the colour of the dissolvable or dispersible material then it is determined that liquid medium is present in the cavity and therefore a flooding event has occurred. If it is determined that a flooding event has occurred, then action may be taken to retire the flexible pipe or set a time limit for expected corrosion of the pipe. The flexible pipe may then be recovered as appropriate.

At step 1005, if it is determined that the colour of the cavity 402 does not correspond to the colour of the dissolvable or dispersible material, then it is determined that liquid medium is not present in the cavity 402 and that a flooding event has not occurred.

It will be appreciated that the method 1000 may be carried out using any variation of the visual detection apparatus described herein.

Various modifications to the detailed arrangements as described above are possible. For example, although the cavity and window are described above as having a generally circular cross-section, they may be formed with a cross-section of any suitable shape. For example, the cavity and window may have an oval, elliptical, square, rectangular, hexagonal, or any other regular or irregular polygonal cross-section.

The end fitting may additionally include one or more attachment elements or handle elements formed on the outer surface of the end fitting in the region of the window. The attachment elements or handle elements may be configured to enable releasable coupling of an ROV to the end fitting to help aid image capture of the cavity through the window. Similarly, a diver may hold on to the attachment elements or handle elements for stability whilst viewing the cavity through the window.

The end fitting may further include a tracking system or visual indicator (for example a flashing light) in the region of the window to help aid location of the window on the end fitting.

The window may be formed from a UV penetrable material to allow for incident UV radiation to enter or be emitted from the cavity.

An existing standard end fitting may be adapted to include a visual flood detection system. For example, the cavity may be formed in the end fitting body by drilling or etching. The dissolvable or dispersible material may be disposed within the cavity (optionally within a housing) and then the window may be positioned over the cavity and fixed into position with a plurality of bolts.

The above-described system provides a cost effective flood detection system that does not require any specialist sensing equipment.

The above-described flood detection system does not require any electrical components, making installation and maintenance easier compared to known systems.

By providing the flood detection system in the end fitting the strength of the flexible pipe body is not compromised.

Examples of the flood detection system described herein reduce the chances of incorrect flood detection since the cavity will not show a colour unless liquid is present in the cavity.

The arrangement described above allows for early detection of a leak in the flexible pipe body, which allows for appropriate action to be taken before catastrophic failure of the pipe occurs.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An end fitting for a flexible pipe, the end fitting comprising:
   a window;
   a cavity disposed in the end fitting radially inwards of the window and configured to be in fluid communication with an annulus of the flexible pipe, wherein a first portion of the cavity is visible from the exterior of the end fitting via the window and a second portion of the cavity is obscured from the exterior of the end fitting by a cover;
   a dissolvable or dispersible material disposed within the second portion of the cavity-such that the dissolvable material is not observable from the window through the cover; and
   a housing disposed in the cavity and housing the dissolvable or dispersible material therein.

2. An end fitting as claimed in claim 1, wherein the dissolvable or dispersible material is configured to dissolve or disperse in a liquid medium upon contact therewith such that the liquid medium is detectable by inspection of the cavity through the window.

3. An end fitting as claimed in claim 2, wherein the housing is configured to contain the dissolvable material until the cavity is flooded with a liquid medium.

4. An end fitting as claimed in claim 3, wherein the cover is opaque.

5. An end fitting as claimed in claim 3, wherein the housing is configured to allow flow of liquid therethrough.

6. The end fitting of claim 3, wherein the housing includes at least one aperture to allow flow of liquid into and out of the housing.

7. An end fitting as claimed in claim 1, wherein the dissolvable or dispersible material is a dye.

8. An end fitting as claimed in claim 1, wherein the dissolvable or dispersible material is a substance which reflects radiation of wavelengths from 1 nm to 1 mm.

9. An end fitting as claimed in claim 1, wherein the dissolvable or dispersible material is a substance which fluoresces under incident radiation of wavelengths from 1 nm to 10 μm.

10. An end fitting as claimed in claim 1, wherein the dissolvable or dispersible material is disposed on at least one substrate.

11. An end fitting as claimed in claim 1, wherein the cavity comprises a radially outer portion and a radially inner portion and wherein the housing is disposed in the radially inner portion such that the radially outer portion is visible via the window.

12. An end fitting as claimed in claim 11, wherein the housing is configured to allow flow of liquid from the radially inner portion to the radially outer portion.

13. An end fitting as claimed in claim 1, wherein the window is mounted in a window surround.

14. An end fitting as claimed in claim 13, wherein the window surround is integral with the end fitting.

15. An end fitting as claimed in 13, wherein the window surround is disposed in a body of the end fitting.

16. An end fitting as claimed in claim 15, further comprising a seal between a jacket of the end fitting and the window surround.

17. An end fitting according to claim 13, wherein the window is retained in the window surround by a retaining ring.

* * * * *